(12) United States Patent
Jene et al.

(10) Patent No.: US 9,995,323 B2
(45) Date of Patent: Jun. 12, 2018

(54) DRIVE UNIT OF A FLUID-ACTUATED LINEAR DRIVE AND METHOD FOR ITS MANUFACTURE

(71) Applicant: FESTO AG & Co. KG, Esslingen (DE)

(72) Inventors: Tobias Jene, Sulzbach (DE); Werner Sauer, Tholey (DE); Christof Buchheit, Riegelsberg (DE)

(73) Assignee: FESTO AG & CO., KG, Esslingen (DE)

( * ) Notice: Subject to any disclaimer, the term of this patent is extended or adjusted under 35 U.S.C. 154(b) by 368 days.

(21) Appl. No.: 14/759,788

(22) PCT Filed: Apr. 29, 2014

(86) PCT No.: PCT/EP2014/001146
§ 371 (c)(1),
(2) Date: Jul. 8, 2015

(87) PCT Pub. No.: WO2014/183835
PCT Pub. Date: Nov. 20, 2014

(65) Prior Publication Data
US 2015/0354608 A1 Dec. 10, 2015

(30) Foreign Application Priority Data
May 16, 2013 (DE) .................. 10 2013 008 408

(51) Int. Cl.
*F15B 15/22* (2006.01)
*B23K 15/04* (2006.01)
(Continued)

(52) U.S. Cl.
CPC ........ *F15B 15/226* (2013.01); *B23K 15/0053* (2013.01); *B23K 15/04* (2013.01);
(Continued)

(58) Field of Classification Search
CPC .... B23K 15/0053; B23K 15/04; B23K 26/24; B23K 26/282; B23K 26/32;
(Continued)

(56) References Cited

U.S. PATENT DOCUMENTS 2,493,602 A * 1/1950 Sterrett ................... F01B 17/00
91/396
3,696,714 A * 10/1972 Panigati .............. F15B 15/1428
92/170.1

(Continued)

FOREIGN PATENT DOCUMENTS

DE 4022447 1/1992
DE 4315458 11/1994
(Continued)

*Primary Examiner* — Logan Kraft
(74) *Attorney, Agent, or Firm* — Hoffmann & Baron, LLP

(57) ABSTRACT

A drive unit of a fluid-actuated linear drive includes a piston rod, an annular drive piston seated coaxially on the piston rod and a buffer sleeve which is likewise seated coaxially on the piston rod. These components are secured to one another by one and the same common welded joint. Furthermore, a method for the manufacture of such a drive unit and a fluid-actuated linear drive equipped with such a drive unit is proposed.

15 Claims, 1 Drawing Sheet

(51) Int. Cl.
*B23K 26/24* (2014.01)
*F15B 15/14* (2006.01)
*B23K 15/00* (2006.01)
*B23K 26/32* (2014.01)
*B23K 26/282* (2014.01)
*B23K 101/00* (2006.01)
*B23K 101/06* (2006.01)
*B23K 101/20* (2006.01)
*B23K 103/10* (2006.01)
*B23K 103/08* (2006.01)
*B23K 103/00* (2006.01)
*B23K 103/04* (2006.01)

(52) U.S. Cl.
CPC ............ *B23K 26/24* (2013.01); *B23K 26/282* (2015.10); *B23K 26/32* (2013.01); *F15B 15/1433* (2013.01); *F15B 15/1447* (2013.01); *B23K 2201/003* (2013.01); *B23K 2201/06* (2013.01); *B23K 2201/20* (2013.01); *B23K 2203/05* (2015.10); *B23K 2203/08* (2013.01); *B23K 2203/10* (2013.01); *B23K 2203/50* (2015.10); *F15B 15/222* (2013.01)

(58) Field of Classification Search
CPC .......... B23K 2201/003; B23K 2201/06; B23K 2201/20; B23K 2203/05; B23K 2203/08; B23K 2203/10; B23K 2203/50; F15B 15/222; F15B 15/226; F15B 15/1433; F15B 15/1447; F15B 15/1452
See application file for complete search history.

(56) References Cited

U.S. PATENT DOCUMENTS

| | | | | |
|---|---|---|---|---|
| 4,352,318 A * | 10/1982 | Kolchinsky | ........... | F15B 15/222 91/395 |
| 6,555,070 B1 * | 4/2003 | Kruger | ................ | F01N 3/2853 422/177 |
| 7,228,785 B2 * | 6/2007 | Wilhelm | ............... | F16F 9/3221 92/109 |
| 7,387,061 B2 * | 6/2008 | Kobata | ................. | F15B 11/048 60/461 |
| 2014/0076157 A1 * | 3/2014 | Fukui | ...................... | F16J 1/008 92/128 |

FOREIGN PATENT DOCUMENTS

| | | | | |
|---|---|---|---|---|
| DE | 10141560 | 3/2003 | | |
| DE | 102009014817 | 9/2010 | | |
| EP | 1503114 A1 * | 2/2005 | ......... | F15B 15/1447 |
| EP | 1503114 | 8/2006 | | |
| EP | 2703653 | 3/2014 | | |
| WO | WO2008104316 | 9/2008 | | |

* cited by examiner

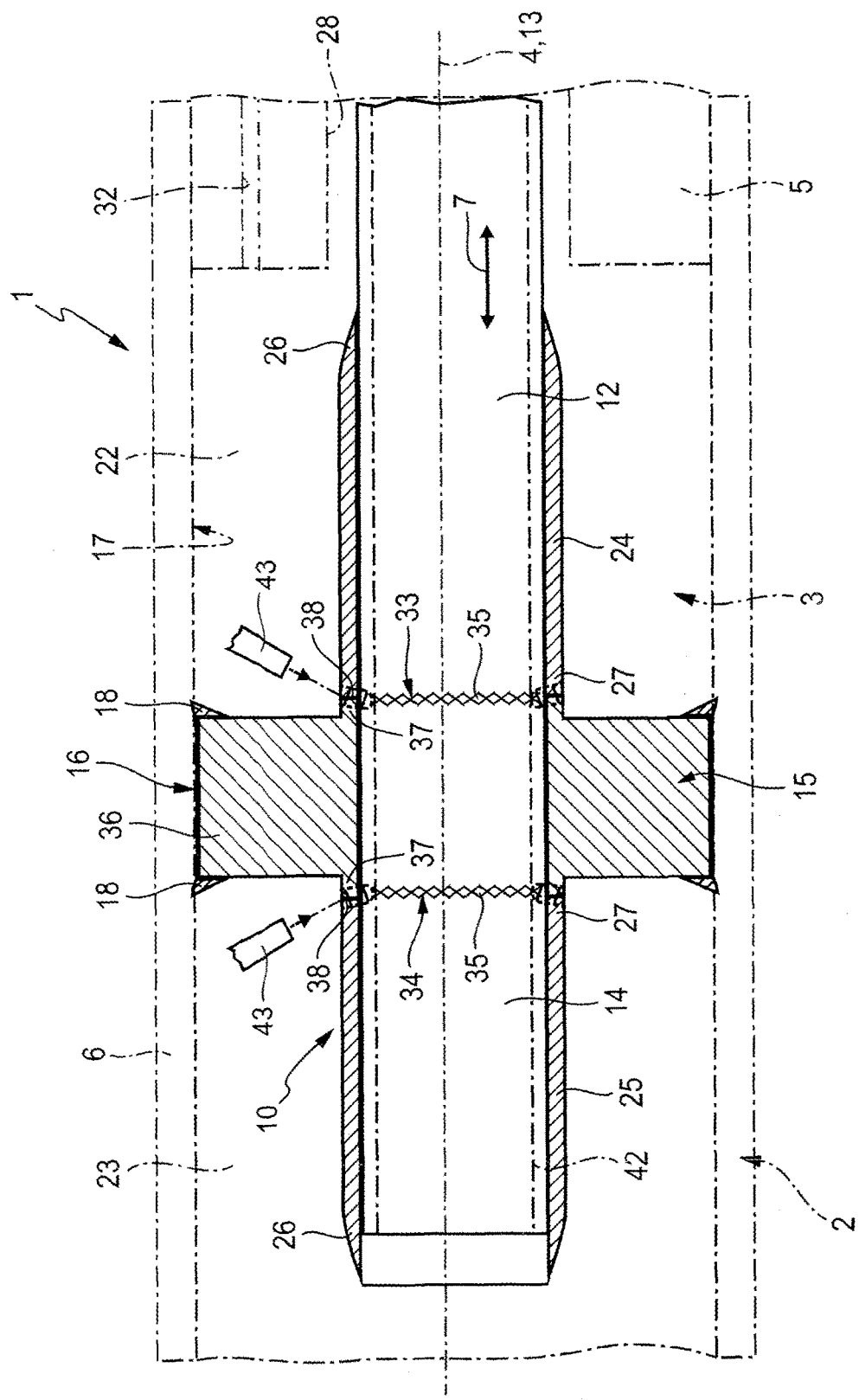

DRIVE UNIT OF A FLUID-ACTUATED LINEAR DRIVE AND METHOD FOR ITS MANUFACTURE

This application claims priority based on an International Application filed under the Patent Cooperation Treaty, PCT/EP2014/001146, filed Apr. 29, 2014, which claims priority to DE102013008408.3, filed on May 16, 2013.

BACKGROUND OF THE INVENTION

The invention relates to a drive unit of a fluid-actuated linear drive, comprising a piston rod, an annular drive piston seated coaxially on the piston rod and a buffer sleeve which is likewise seated coaxially on the piston rod while axially adjoining the drive piston and which is used for end-of-stroke cushioning purposes, these components being secured to one another with the assistance of a welded joint.

The invention further relates to a fluid-actuated linear drive equipped with such a drive unit.

Finally, the invention relates to a method for the manufacture of a drive unit of a fluid-actuated linear drive which comprises a piston rod, an annular drive piston seated coaxially on the piston rod and a buffer sleeve which is likewise seated coaxially on the piston rod while axially adjoining the drive piston and which is used for end-of-stroke cushioning purposes, these components being secured to one another with the assistance of a welded joint.

Such prior art is known from EP 1 503 114 B1, in which an annular drive piston pushed onto a piston rod is axially clamped immovably between two retaining rings which axially flank the drive piston on both sides and are welded to the piston rod by means of a laser weld which is concentric with the piston rod. Alternatively, one end of the drive piston can be supported on a step of the piston rod, so that only the other end is secured by means of a retaining ring welded to the piston rod. A buffer sleeve for end-of-stroke cushioning purposes is pushed onto the piston rod and latched to one of the retaining rings. The buffer sleeve is mounted after the establishment of the welded joint between the retaining ring and the piston rod.

The known drive unit can be produced advantageously, because the axial position of the drive piston relative to the piston rod can be predetermined in a variable manner by the selection of the location of the welded joint. In this way, different customer requirements can be met in an extremely flexible way. It nevertheless involves a not inconsiderable time for the installation of the buffer sleeve, which has to be pushed onto the piston rod after a retaining ring has been welded on and which then has to be latched to the retaining ring.

DE 101 41 560 A1 discloses a fluid-actuated operating cylinder and a method for its manufacture, wherein a piston is pushed onto the piston rod and directly secured to the piston rod by means of a riveted or welded joint. The piston can in particular be secured to the piston rod by friction welding.

DE 40 22 447 A1 discloses a fluid-actuated operating cylinder in which a cylinder end cover is joined to the cylinder barrel by adhesive force in a friction welding process.

SUMMARY OF THE INVENTION

The invention is based on the problem of proposing measures which allow a both variable and cost-effective manufacture of a drive unit comprising a drive piston and at least one buffer sleeve.

In a drive unit of the type referred to above, this problem is solved by providing that the drive piston, the buffer sleeve and the piston rod are secured to one another by one and the same common welded joint.

The problem is further solved by a fluid-actuated linear drive which comprises a drive housing and a drive unit which is axially movable relative thereto, the drive unit being designed in the manner referred to above and the drive piston being capable of linear displacement in the drive housing.

In combination with a method of the type referred to above, the problem is further solved by providing that the drive piston and the buffer sleeve are pushed onto the piston rod which has been provided previously and then welded to one another as well as to the piston rod while forming a common welded joint.

In this way, the desired firm bond of the piston rod, the drive piston and the buffer sleeve can be obtained by means of one and the same welded joint. This welded joint, which is described as "common welded joint", ensures both that the drive piston is welded to the buffer sleeve and that both these components are welded to the piston rod. There is therefore no need for additional special retaining bodies for the location of the drive piston. Furthermore, special joining devices for mounting the buffer sleeve can be omitted. In one and the same welding process, all three components can be secured to one another, which makes for short manufacture times and accordingly for a cost-effective production.

Advantageous further developments of the invention can be derived from the dependent claims.

If the drive unit is provided for a fluid-actuated linear drive, in which end-of-stroke cushioning is desirable in both movement directions of the drive unit, the drive unit can be provided with two buffer sleeves, the annular drive piston being located between the two buffer sleeves. In this case, it is expedient to weld each of the two buffer sleeves by means of its own common welded joint both to the drive piston and to the piston rod. As a result, there is one of the two common welded joints on each axial side of the drive piston.

In an application of the drive unit in a fluid-actuated linear drive, the buffer sleeve has the purpose of contributing to a fluidic end-of-stroke cushioning when the drive unit approaches an end-of-stroke position. The buffer sleeve then dips into an opening of an end wall of the linear drive to close it fully or partially, so that the flow of fluid displaced by the drive piston is restricted, which effects a deceleration of the stroking movement of the drive unit. Depending on whether such end-of-stroke cushioning is desired in only one direction of drive unit movement or in both directions, the drive unit can be fitted with only one buffer sleeve or with two buffer sleeves.

The common welded joint can be formed particularly well if the drive piston has, on the end face facing the buffer sleeve, an axial mounting projection which is concentric with the piston rod and against which the adjacent buffer sleeve bears axially, the common welded joint being formed in the transition region between the mounting projection and the buffer sleeve. The welding process is in particular performed in a state in which the buffer sleeve bears against the mounting projection. The welded joint extends between the mounting projection and the buffer sleeve into the material of the piston rod. Material regions of the mounting projection, the buffer sleeve and the piston rod are therefore melted and joined to one another by adhesive force. The outer diameter of the mounting projection expediently corresponds to the outer diameter of the facing axial end section of the buffer sleeve.

The common welded joint is expediently produced by means of a weld seam which is concentric with the piston rod and which provides a fluid-tight joint between the drive piston and the piston rod, so that no pressure fluid can overflow between the two axial sides of the drive piston in the region between the drive piston and the piston rod in the operation of the drive unit. The common welded joint is preferably restricted to a single annular weld seam. The welded joint or weld seam is expediently produced by laser beam welding or electron beam welding. This preferably does not involve the use of any added material, so that the three components of the common welded joint are directly welded to one another.

At least in the regions participating in the common welded joint, the components are preferably made of metal, in particular of stainless steel or an aluminium material. It is advantageous if at least the piston rod and/or each buffer sleeve consist(s) entirely of metal. If the buffer sleeve consists of metal, it is in particular designed as a deep-drawn component.

The drive piston expediently has a piston body made of metal, which participates in each common welded joint. It can be of a single- or a multi-part design and expediently supports at least one sealing element which slidably bears against a drive housing of the fluid-actuated linear drive with sealing contact during the operation of the drive unit.

For savings in material and weight, in particular, the piston rod can be designed to be tubular. A low weight saves energy in operation and delivers high acceleration values if required.

The common welded joint expediently involves only the piston rod, the drive piston and a buffer sleeve. There is no need for additional components.

The piston rod expediently has a constant diameter along its entire length, which corresponds to the inner diameter of the annular drive piston, so that the latter can, when being mounted on the piston rod, be pushed into any desired position and secured there while producing a common welded joint. Depending on the length of the associated linear drive, the drive piston can therefore secured to the piston rod in an individually variable position.

BRIEF DESCRIPTION OF THE DRAWINGS

The invention is explained in greater detail below with reference to the accompanying drawing. The single FIGURE (FIG. 1) is a longitudinal section through an end section of a preferred embodiment of the drive unit according to the invention, which includes the drive piston, further components of a fluid-actuated linear drive equipped with the drive unit being indicated by dot-dash lines.

DETAILED DESCRIPTION OF THE PREFERRED EMBODIMENTS

FIG. 1 shows, partially in dot-dash lines, a section of a fluid-actuated linear drive 1 constructed in accordance with the invention, which is equipped with a drive unit 10 according to the invention, which has an advantageous structure.

This drive unit 10 is produced by means of the method according to the invention.

The fluid-actuated linear drive 1 comprises a drive housing 2, in the inside of which there is a housing interior 3 of an oblong shape. The drive housing 2 has an imaginary longitudinal axis 4.

At its two axially oriented end faces, the drive housing 2 is provided with an end wall 5 each, the drawing showing only one of the two end walls 5. Peripherally, the housing interior 3 is bounded by a tubular section 6 of the drive housing 2, which extends between the two end walls 5.

The linear drive 1 further comprises the drive unit 10 referred to above, which is movable relative to the drive housing 2 in the axial direction of the longitudinal axis 4 while performing a linear stroking movement 7 indicated by a double-headed arrow.

The drive unit 10 comprises a piston rod 12 having a longitudinal axis 13. In the assembled state of the linear drive 1, a longitudinal section of the piston rod 12, which is hereinafter referred to as drive section 14, extends in the housing interior 3. At least one of the end walls 5 has a wall opening 15 through which the piston rod 12 passes axially, so that a drive end section of the piston rod 12, which is not illustrated in detail, is outside the drive housing 2, where it is provided with a suitable interface facilitating the mounting of a component to be moved.

In the illustrated embodiment, the piston rod 12 passes through only one of the two end walls 5, and the other end wall 5, which is not shown in the drawing, is closed. Alternatively, the piston rod 12 can be a continuous part passing through both end walls 5, in which case the drive section 14 is represented by a central longitudinal section of the piston rod 12. In the assembled state of the linear drive 1, the longitudinal axes 3, 14 of the drive housing 2 and the piston rod 12 coincide.

An annular drive piston 15 is seated concentrically on the drive section 14 of the piston rod 12. This is permanently joined to the piston rod 12. With its radially outward-oriented outer circumferential surface 16, the drive piston 15 of the assembled linear drive 1 bears against the inner circumferential surface 17 of the tubular section 6 while being capable of sliding displacement. The drive piston 15 expediently comprises at least one sealing element 18, which is preferably made of a material having rubber-elastic properties and which bears against the inner circumferential surface 17 while forming a seal and while being capable of sliding displacement.

The drive piston 15 axially divides the housing interior 3 into two operating chambers 22, 23, the opposite side of which is bounded by one of the two end walls 5 each.

In the operation of the linear drive 1, each operating chamber 22, 23 can optionally be subjected to the application of a pressure fluid or pressure-relieved. For this purpose are provided fluid passages which pass through the drive housing 2 and which are not shown in detail. In this way, a controlled application of fluid to the drive piston 15 is made possible for generating the stroking movement 7 in one or the other direction. Compressed air is the preferred pressure fluid.

Within the stroking movement 7, the drive unit 10 can be moved between two end-of-stroke positions in which the drive piston 15 has approached one of the two end walls 5 and has in particular come into contact therewith. In order to avoid a hard impact of the drive piston 15 when reaching its end-of-stroke positions, the drive unit 10 is provided, in addition to the piston rod 12 and the drive piston 15, with two buffer sleeves 24, 25, which provide a fluidic end-of-stroke cushioning effect.

The two buffer sleeves 24, 25, which will hereinafter also be referred to as first and second buffer sleeve 24, 25, are arranged coaxially on the drive section 14 of the piston rod 12 on axially opposite sides of the piston rod 12. In a manner of speaking, the piston rod 12 is flanked by the two buffer sleeves 24, 25 on axially opposite sides. The two buffer sleeves 24, 25 are permanently joined to the drive piston 15.

Each of the two buffer sleeves 24, 25 has a front end section 26 remote from the drive piston 15 and a rear end section 27 facing the drive piston 15. Its outer diameter is smaller than that of the drive piston 15. At the front end section 26, each of the two buffer sleeves 24, 25 expediently tapers towards the front.

An embodiment of the drive unit 10 which is provided with only one buffer sleeve is also possible. This is the case if end-of-stroke cushioning is desired in only one stroking direction of the drive unit 10.

In order to enable the buffer sleeves 24, 25 to have a end-of-stroke cushioning effect, the end wall 5 of the drive housing 2 which is situated opposite a buffer sleeve 24, 25 is provided with an opening which is hereinafter referred to as cushioning opening 28, which is oriented coaxial with the associated buffer sleeve 24, 25 and which is designed such that the associated buffer sleeve 24, 25 can dip into the cushioning opening 28 while partially or completely blocking the opening cross-section, when the drive unit 10 approaches the respective end-of-stroke position.

When performing the stroking movement 7, the drive piston 15 displaces from the operating chamber 22, 23 towards which is currently moves the pressure fluid contained therein through the associated cushioning opening 28. When the drive unit 10 has approached its end-of-stroke position closely enough, the advancing buffer sleeve 24 or 25 dips into the cushioning opening 28, thereby limiting or blocking the outflow cross-section available to the displaced pressure fluid. As a result, the enclosed pressure fluid can be discharged only in a restricted way through a restrictor passage 32 communicating with the same operating chamber 22, 23 as the cushioning opening 28, the available flow rate being reduced considerably, so that the drive unit 10 is decelerated. The restrictor passage 32 can be formed in the drive housing 2 or in the buffer sleeve 24, 25, for example.

An advantageous structure of the drive unit 10 provides that the drive piston 15, the first buffer sleeve 24 and the piston rod 12 are secured to one another by one and the same common welded joint 33. In the same way, the drive piston 15, the second buffer sleeve 25 and the piston rod 12 are secured to one another by one and the same further common welded joint 34. These two common welded joint 33, 34 will hereinafter also be referred to as first common welded joint 333 and second common welded joint 34. Each buffer sleeve 24, 25 is therefore welded to the drive piston 15 on the one hand and to the piston rod 12 on the other hand by means of its own common welded joint 33, 34.

In a case in which the drive unit 10 has only one buffer sleeve 24, 25 seated on the piston rod 12 axially adjacent to the drive piston 15, there will obviously be only one common welded joint 33 or 34. The term "common" welded joint is meant to express that the drive piston 15 and the respective buffer sleeve 24 or 25 are not welded to the piston rod 12 separately and independently, but rather in one and the same welding process.

Each common welded joint 33, 34 preferably features a fluid-tight weld seam 35 which is concentric with the piston rod 12 and by means of which not only the drive piston 15 is welded to the buffer sleeve 24 or 25, but also a weld to the piston rod 12 is provided.

The fluid-tight weld seam 35 produces a fluid-tight common welded joint 33, 34, thereby eliminating an exchange of fluid between the two operating chambers 22, 23 between the welded components.

The common welded joint 33, 34 expediently is a laser beam weld or an electron beam weld. The common welded joint 33, 34 preferably does not involve any added material and is based on a direct joining by adhesive force between melted parts of the welded components.

The drive piston 15 is expediently composed of several components. In the illustrated embodiment, it comprises a piston body 36 which participates in each common welded joint 33, 34 and which supports the at least one sealing element 18. In the illustrated embodiment, the piston body 36 is a single part, but is can also be a multi-part component.

The components of the drive unit 10 which are secured to one another by the common welded joint 33, 34 are expediently made of metal at least in the regions which are directly involved in the welded joint. It is particularly expedient if the piston rod 12 and/or each buffer sleeve 24, 25 is/are completely made of metal. In the illustrated embodiment, both the piston rod 12 and each buffer sleeve 24, 25 are metal parts, consisting expediently of stainless steel or an aluminium material.

For the buffer sleeves 24, 25, production as a deep-drawn stainless steel component is to be recommended in particular.

In the drive piston 15 of the illustrated embodiment, the piston body 36 is entirely made of metal.

The common welded joint 33, 34 can be formed in a particularly simple way if the drive piston 15 has at the end face adjacent to each buffer sleeve 24, 25 an axial mounting projection 37 which is concentric with the piston rod 12 and against which the respective adjacent buffer sleeve 24, 25 bears axially. The annular mounting projection 37 is expediently a single-part component of the piston body 36. It preferably extends away axially from the piston body 36 in the manner of a collar.

The common welded joint 33, 34 is formed in the contact region 38 between each buffer sleeve 24, 25 and the drive piston 15, the contact region 38 having an annular shape concentric with the piston rod 12. In the illustrated embodiment, the contact region 38 is represented by the adjoining end faces of the annular mounting projection 37 and the adjacent end face of the rear end section 27 of the associated buffer sleeve 24, 25.

Each common welded joint 33, 34 extends in the associated contact region 38 between the two adjoining components 15/24 and 15/25 respectively into the piston rod 12 or its material. In the region of the common welded joint 33, 34, adjoining regions of the drive piston 15, the piston rod 12 and a buffer sleeve 24 or 25 are melted, resulting in a joint based on adhesive force.

The outer diameter of the mounting projection 37 expediently corresponds to the outer diameter of the facing rear end section 27 of the buffer sleeve 24, 25.

The inner diameter of the drive piston 15 and the two buffer sleeves 24, 25 expediently corresponds to the outer diameter of the piston rod 12 in the region of the drive section 14. The piston rod 12 preferably has the same outer diameter along its entire length.

In the illustrated embodiment, the piston rod 12 consists of solid material. It can, however, advantageously be designed to be tubular, which is indicated by dot-dash lines at 42. A hollow piston rod 42 offers the advantage of a low weight and reduced material consumption. In addition, the cavity can be used as a medium passage if required, for example by routing cables or hoses through the piston rod. Furthermore, the cavity in the piston rod 12 can be used for the installation of sensors or of actuating elements for sensors.

In a preferred method for the manufacture of the drive unit 10, the drive piston 15 and at least one buffer sleeve 24, 25 are pushed onto the piston rod 12 and positioned at the desired mounting location. In this process, the drive piston 15 and the at least one buffer sleeve 24, 25 are axially brought into mutual contact, so that they bear against one another in the contact region 38. Following this, the continuous weld seam 35 is produced in the contact region 38 by means of a welding apparatus 43 radially from the outside, the welding apparatus 43 being expediently guided around the drive unit 10.

If the drive unit 10 is to be fitted with two buffer sleeves 24, 25, the weld seams 35 for the two common welded joints 33, 34 are produced either consecutively or—by means of more than one welding apparatus 43—simultaneously.

As the weld seam 35 of each common welded joint 33, 34 extends around the entire piston rod 12 and produces a continuous closed welded joint between the drive piston 15, the associated buffer sleeve 24 or 25 and the piston rod 12, there is no need for additional sealing means, such as a sealing ring, between the piston rod 12 and the components 15, 24, 25 mounted thereon.

Each common welded joint 33, 34 expediently comprises only a single weld seam 35 which is continuous all round.

The invention claimed is:

1. A drive unit of a fluid-actuated linear drive, comprising a piston rod, an annular drive piston seated coaxially on the piston rod and a buffer sleeve which is likewise seated coaxially on the piston rod while axially adjoining the drive piston and which is used for end-of-stroke cushioning purposes, wherein the drive piston, the buffer sleeve and the piston rod are secured to one another by one and the same common welded joint, the common welded joint being formed in a contact region between the buffer sleeve and the drive piston, the contact region having an annular shape concentric with the piston rod, and wherein the common welded joint extends radially inward through the contact region between the drive piston and the buffer sleeve and into the material of the piston rod.

2. A drive unit according to claim 1, wherein two buffer sleeves flanking the drive piston on axially opposite sides are seated on the piston rod, each buffer sleeve being permanently joined to the drive piston and the piston rod by means of its own common welded joint.

3. A drive unit according to claim 1, wherein the common welded joint comprises a fluid-tight weld seam which is concentric with the piston rod and by means of which both the drive piston is welded to the buffer sleeve and both these components are simultaneously welded to the piston rod.

4. A drive unit according to claim 1, wherein the common welded joint is a laser beam weld or an electron beam weld.

5. A drive unit according to claim 1, wherein the common welded joint is formed directly between the welded components without the use of any added material.

6. A drive unit according to claim 1, wherein the components secured to one another by the common welded joint are made of metal at least in the regions participating in the welded joint.

7. A drive unit according to claim 1, wherein at least the piston rod and/or each buffer sleeve is/are made of metal.

8. A drive unit according to claim 1, wherein the drive piston has a single-part or multi-part piston body which is made of metal, which participates in the common welded joint and which supports at least one sealing element.

9. A drive unit according to claim 1, wherein the piston rod is designed to be tubular.

10. A drive unit of a fluid-actuated linear drive, comprising a piston rod, an annular drive piston seated coaxially on the piston rod and a buffer sleeve which is likewise seated coaxially on the piston rod while axially adjoining the drive piston and which is used for end-of-stroke cushioning purposes, wherein the drive piston, the buffer sleeve and the piston rod are secured to one another by one and the same common welded joint, and
wherein the drive piston has, on the end face facing the buffer sleeve, an axial mounting projection which is concentric with the piston rod and against which the adjacent buffer sleeve bears axially, the common welded joint being formed in the transition region between the mounting projection and the buffer sleeve and extending between the axial mounting projection and the buffer sleeve into the piston rod, the outer diameter of the mounting projection corresponding to the outer diameter of the facing axial end section of the buffer sleeve.

11. A fluid-actuated linear drive, comprising a drive housing and a drive unit which is axially movable relative to the drive housing, the drive unit comprising:
a piston rod;
an annular drive piston seated coaxially on the piston rod, the annular drive piston being capable of linear displacement in the drive housing; and
a buffer sleeve which is likewise seated coaxially on the piston rod while axially adjoining the drive piston and which is used for end-of-stroke cushioning purposes,
wherein the drive piston, the buffer sleeve and the piston rod are secured to one another by one and the same common welded joint, and
wherein the drive piston has, on the end face facing the buffer sleeve, an axial mounting projection which is concentric with the piston rod and against which the adjacent buffer sleeve bears axially, the common welded joint being formed in the transition region between the mounting projection and the buffer sleeve and extending between these two components into the piston rod, the outer diameter of the mounting projection corresponding to the outer diameter of the facing axial end section of the buffer sleeve.

12. A method for the manufacture of a drive unit of a fluid-actuated linear drive which comprises a piston rod, an annular drive piston seated coaxially on the piston rod and a buffer sleeve which is likewise seated coaxially on the piston rod while axially adjoining the drive piston and which is used for end-of-stroke cushioning purposes, the method comprising:
pushing the drive piston and the buffer sleeve onto the piston rod which has been provided previously, the drive piston having an end face facing the buffer sleeve and an axial mounting projection concentric with the piston rod on the end face, the buffer sleeve axially bearing against the axial mounting projection of the drive piston; and
simultaneously welding the drive piston, the buffer sleeve and the piston rod to form a common welded joint, the common welded joint being formed in a transition region between the axial mounting projection and the buffer sleeve and extending between the axial mounting projection and the buffer sleeve into the piston rod, the outer diameter of the axial mounting projection corresponding to the outer diameter of the facing axial end section of the buffer sleeve.

13. A method according to claim 12, wherein two buffer sleeves are pushed onto the piston rod in such a way that they flank the drive piston on axially opposite sides, each buffer sleeve being welded to the drive piston and the piston rod while forming an own common welded joint.

14. A method according to claim 12, wherein the common welded joint is produced by means of a fluid-tight weld seam which is concentric with the piston rod and by means of which both the drive piston is welded to the buffer sleeve and both these components are simultaneously welded to the piston rod.

15. A method according to claim 12, wherein the common welded joint is produced as a laser beam weld or an electron beam weld.

\* \* \* \* \*